(12) United States Patent
Golding et al.

(10) Patent No.: US 9,536,521 B2
(45) Date of Patent: Jan. 3, 2017

(54) VOICE RECOGNITION

(71) Applicant: Xerox Corporation, Norwalk, CT (US)

(72) Inventors: Michael Golding, Hertfordshire (GB); Sreedharan Deepak Nair, Karnataka (IN); Leslie Wynn, Hertfordshire (GB); Mohan Vijayalaya Pandian, Tamilnadu (IN)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/319,247

(22) Filed: Jun. 30, 2014

(65) Prior Publication Data

US 2015/0379986 A1    Dec. 31, 2015

(51) Int. Cl.
| | | |
|---|---|---|
| *G10L 17/00* | (2013.01) | |
| *G10L 15/00* | (2013.01) | |
| *G10L 15/08* | (2006.01) | |
| *G10L 17/26* | (2013.01) | |
| *G10L 15/22* | (2006.01) | |

(52) U.S. Cl.
CPC ............ *G10L 15/08* (2013.01); *G10L 15/005* (2013.01); *G10L 15/22* (2013.01); *G10L 17/26* (2013.01)

(58) Field of Classification Search
None
See application file for complete search history.

(56) References Cited

U.S. PATENT DOCUMENTS

| | | | |
|---|---|---|---|
| 4,353,653 A | 10/1982 | Zimmerman | |
| 5,581,600 A | 12/1996 | Watts et al. | |
| 5,974,372 A | 10/1999 | Barnes et al. | |
| 6,243,675 B1 * | 6/2001 | Ito | G10L 15/22 704/231 |
| 6,304,844 B1 * | 10/2001 | Pan | G10L 15/02 704/231 |
| 6,384,922 B1 | 5/2002 | Hayama et al. | |
| 6,963,836 B2 * | 11/2005 | Van Gestel | G06F 3/16 704/231 |
| 7,082,574 B2 | 7/2006 | Ogino et al. | |
| 7,424,129 B2 * | 9/2008 | Hull | G06F 17/212 382/100 |
| 7,577,569 B2 * | 8/2009 | Roth | G10L 15/22 704/235 |
| 7,873,517 B2 * | 1/2011 | Prieto | G10L 15/005 704/255 |
| 7,988,050 B2 | 8/2011 | Kitada et al. | |
| 7,996,269 B2 | 8/2011 | Inouye | |
| 8,069,030 B2 | 11/2011 | Iso-Sipilä et al. | |

(Continued)

*Primary Examiner* — Satwant Singh
(74) *Attorney, Agent, or Firm* — Kermit D. Lopez; Luis M. Ortiz; Kevin Soules (57) ABSTRACT

A voice recognition method and system. A voice command can be received from a speech recognition unit associated with a device by a language switching module configured in association with the device. The voice command is recognized and processed into particular content to identify via a language database, a language associated with the device. The language can then be changed based on a detected language so that the language can be altered without reference to an instruction manual. In one scenario, a user walks toward the machine or device associated with the user device and speaks the desired/known language. The device "listens" to the voice, detects the language, and changes the user interface accordingly.

20 Claims, 4 Drawing Sheets

(56) References Cited

U.S. PATENT DOCUMENTS

| | | | |
|---|---|---|---|
| 8,078,467 B2* | 12/2011 | Wu | G06F 17/275 |
| | | | 704/255 |
| 8,505,066 B2 | 8/2013 | Watanabe | |
| 8,539,344 B2 | 9/2013 | Hull et al. | |
| 8,643,567 B2 | 2/2014 | Deng et al. | |
| 2002/0013701 A1* | 1/2002 | Oliver | G06F 3/16 |
| | | | 704/231 |
| 2002/0082844 A1* | 6/2002 | Van Gestel | G06F 3/16 |
| | | | 704/275 |
| 2004/0267528 A9* | 12/2004 | Roth | G10L 15/22 |
| | | | 704/251 |
| 2005/0131685 A1* | 6/2005 | Roth | G10L 15/005 |
| | | | 704/231 |
| 2006/0074629 A1 | 4/2006 | Chiu et al. | |
| 2006/0136220 A1* | 6/2006 | Gurram | G10L 15/005 |
| | | | 704/275 |
| 2006/0149545 A1* | 7/2006 | Huang | G10L 15/22 |
| | | | 704/236 |
| 2006/0212441 A1* | 9/2006 | Tang | G06F 17/30687 |
| 2011/0288859 A1* | 11/2011 | Taylor | G10L 15/22 |
| | | | 704/231 |
| 2012/0113019 A1* | 5/2012 | Anderson | G06F 1/1616 |
| | | | 345/173 |
| 2014/0029032 A1 | 1/2014 | Hilbert et al. | |
| 2014/0067371 A1* | 3/2014 | Liensberger | G06F 3/0237 |
| | | | 704/9 |
| 2014/0317523 A1* | 10/2014 | Wantland | H04L 67/22 |
| | | | 715/744 |
| 2015/0006147 A1* | 1/2015 | Schmidt | G10L 15/005 |
| | | | 704/8 |
| 2015/0040012 A1* | 2/2015 | Faaborg | G10L 15/22 |
| | | | 715/728 |

* cited by examiner

VOICE RECOGNITION

FIELD OF THE INVENTION

Embodiments are related to voice recognition applications. Embodiments also relate to user interface (UI) systems and devices employed in a variety of devices, machines, and systems. Embodiments are additionally related to applications for switching languages utilized in user interfaces.

BACKGROUND

User interfaces are utilized in a variety of devices and systems, ranging from personal computers to mobile devices, such as smartphones, machines, and systems, such as automobiles, appliances, and other mechanisms.

User interfaces allow a user to operate an information platform in a convenient and user-friendly manner. Such a user interface typically includes hardware (physical) and software (logical) components, although some user interfaces are implemented in the context of a GUI (Graphical User Interface). The user interface can be employed to operate the machine in an easy (self exploratory), efficient, and enjoyable (user-friendly) manner to produce a desired result. This generally means that the operator needs only provide minimal input to achieve a desired output, and also so that the device minimizes undesired outputs.

One problem encountered in such user interface components is the use of different languages (i.e., a variety of users may speak different languages). To overcome language barriers, a greater number of applications are produced to provide a UI (User Interface) output in multiple languages. Conventionally, a physical key located on the machine or device may be employed to change the language, which is not recognizable and lacks universal design features. Thus, such a physical key implementation is limited in practical usage. Regardless of the use of a physical key, however, difficulties are faced by users when encountering a UI associated with a language other than that spoken by the user.

Based on the foregoing, it is believed that a need exists for an improved method and system for switching UI languages, as will be described in greater detail herein.

SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an improved method and system for managing a mechanism or device.

It is another aspect of the disclosed embodiments to provide for a voice recognition method and system for switching user interface languages with respect to a mechanism or device.

The aforementioned aspects and other objectives and advantages can now be achieved as described herein. A voice recognition method and system for switching user interface language with respect to a device utilizing a voice control is disclosed herein. A user interface language switching module can be configured in association with the device (e.g., a computing hand held device, an automobile, an MFD or Multi-Function Device such as a copier/printer, etc.) in order to receive a voice command with respect to a user from a speech recognition device (e.g., microphone) located on the device. The voice command can be recognized and processed into a content to determine a language displayed on the user interface utilizing a language database. The user interface language can then be changed based on the detected language. Such an approach eliminates a hard-button on the user interface panel and the user can easily change the user interface language without referring to an instruction manual.

The voice recognition module receives a voice-based input including at least one utterance or verbalization with respect to a desired language spoken by the user. The database includes translations of different languages that can be pre-installed on the device. The system selects the language utilized to display messages and other information in any one of several languages by recognizing the voice command of the user from the speech recognition device. Such an approach switches the user interface languages with respect to the device in order to be used in multiple localities in which the multiple languages are used.

BRIEF DESCRIPTION OF THE FIGURES

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The disclosed embodiments are described in part below with reference to flowchart illustrations and/or block diagrams of methods, systems, computer program products and data structures according to embodiments of the invention. It will be understood that each block of the illustrations, and combinations of blocks, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Figure 1:
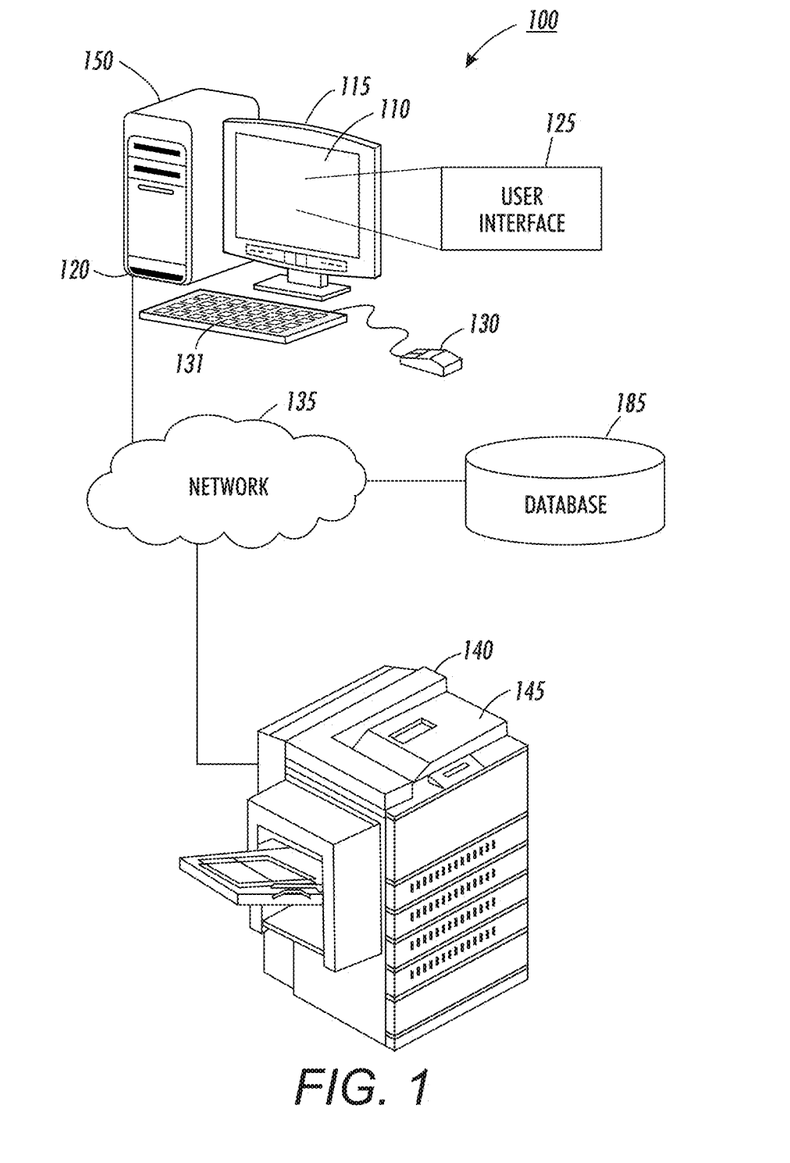
FIG. 1 illustrates an example of a multi-function device coupled to a data-processing apparatus through a network, in accordance with the disclosed embodiments.

Referring to FIG. 1, a system 100 can be configured to include one or more networked devices, such as networked device 140, which can communicate electronically with a data-processing apparatus 110 through a network 135. In some embodiments, networked device 140 may be a rendering device such as a printer, scanner, copy machine, etc. In other embodiments, networked device 140 may be an MFD, a file server, and/or a print server. In still other embodiments, the device 140 may be implemented in the context of a system such as an automobile, avionics systems, and other systems and components.

The data-processing apparatus 110 may be, for example, a computing device, and generally includes a central processor 120, a display device 115, and in some cases, a keyboard 131, and a pointing device 130 (e.g., mouse, track ball, pen device, or the like). In some embodiments, data-processing apparatus 110 may be a server or computing device such as a laptop computer or a personal computer. In other embodiments, data-processing apparatus 110 may be a portable communications device or hand held computing device such as a tablet computing device, a smartphone (e.g., cellular phone), PDA (Personal Digital Assistant), and so on.

Note that as utilized herein, the term "networked device" may refer to an apparatus or system such as a printer, scanner, fax machine, copy machine, etc., and/or a combination thereof (e.g., an MFD) or other systems or devices (e.g., automotive, avionics, etc.).

The data-processing apparatus 110 can communicate electronically with the device 140 through a computer network 135. The network 135 may employ any network topology, transmission medium, or network protocol. The network 135 may include connections, such as wire, wireless communication links, or fiber optic cables. In the depicted example, network 135 is the Internet representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational, and other computer systems that route data and messages. In some embodiments, network 135 may be implemented as a WiFi network with Internet communications.

The device 140 can include, for example, a user interface 145 (e.g., panel menu). Such a panel menu may be used to select features and enter other data in the device 140. Such interfaces may include, for example, touch screens having touch activated keys for navigating through an option menu or the like. A driver program, for example, can be installed on or at the data-processing apparatus 110 and can reside on the host device's hard drive 150. In some embodiments, a driver program may be activated through an application interface so that a user may implement a particular job with the driver for processing by the device 140. The user interface 145 can display information and receive data through a device display and/or other data input system or unit. The interface 145 also serves to display results, whereupon the user may supply additional inputs or terminate a given session.

The user interface 145 of the networked device 140 may be, for example, a local user interface, such as a touch-screen display or separate keypad and display or a memory fob or the like as discussed above. Alternatively or additionally, the input device may be a wireless port that receives a wireless signal containing constraint data from a portable device. The wireless signal may be an infrared or electromagnetic signal. A system administrator may input constraint data through the local user interface by manipulating the touch screen, keypad, or communicating via wireless messages through the wireless port. The administrator's portable device that communicates wirelessly may be a personal digital assistant (PDA), table computer, smartphone, or the like, as noted above.

The following description is presented with respect to embodiments of the disclosed embodiments, which can be embodied in the context of the data-processing apparatus 110 and the networked device 140 depicted in FIG. 1. The disclosed embodiments, however, are not limited to any particular application or any particular environment. Instead, those skilled in the art will find that the system and method of the disclosed embodiments may be advantageously applied to a variety of system and application software, including database management systems, word processors, and the like. Moreover, the present invention may be embodied on a variety of different platforms, including Macintosh, UNIX, LINUX, and the like. Therefore, the description of the exemplary embodiments, which follows, is for purposes of illustration and not considered a limitation.

Figure 2:
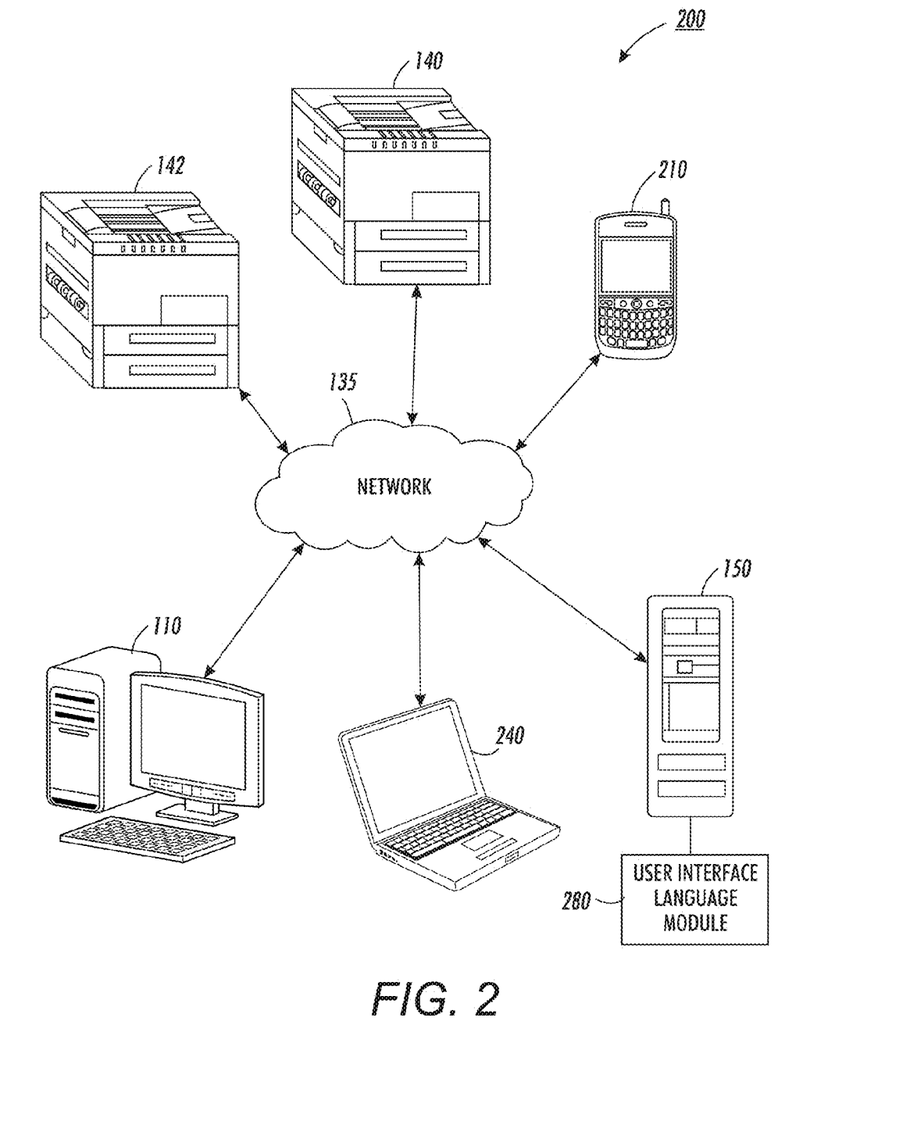
FIG. 2 illustrates a graphical representation of a device management system having a user interface language switching module associated with a network, in accordance with the disclosed embodiments.

FIG. 2 illustrates a graphical representation of a device management system 200 having a user interface language switching module 280 associated with the network 135, in accordance with the disclosed embodiments. The device management system 200 can include, for example, the network infrastructure 135 associated with one or more networked devices 140 and 142, data-processing system 110, a laptop 240, and a mobile communications device 210. Data-processing apparatus 110 depicted in FIG. 1 can be, for example, a server. Other devices such as, for example, desktops, network devices, palmtops, mobile phones, etc., may also be included in the network 135 as service providers. The devices 140 and 142 can be located remotely with respect to each other, or alternatively, they may be located locally with respect to each other.

The user interface language switching module 280 can be configured in association with the server 150 for switching user interface language with respect to the devices 140 and 142 utilizing, for example, a voice control. Note that as utilized herein, the term "module" may refer to a physical hardware component and/or to a software module. In the computer programming arts, such a software "module" may be implemented as a collection of routines and data structures that performs particular tasks or implements a particular abstract data type. Modules of this type are generally composed of two parts. First, a software module may list the constants, data types, variable, routines, and so forth that can be accessed by other modules or routines. Second, a software module may be configured as an implementation, which can be private (i.e., accessible only to the module), and which contains the source code that actually implements the routines or subroutines upon which the module is based.

Therefore, when referring to a "module" herein, the inventors are generally referring to such software modules or implementations thereof. The methodology described herein can be implemented as a series of such modules or as a single software module. Such modules can be utilized separately or together to form a program product that can be implemented through signal-bearing media, including transmission media and recordable media. The present invention is capable of being distributed as a program product in a variety of forms, which apply equally regardless of the particular type of signal-bearing media utilized to carry out the distribution.

Examples of signal-bearing media can include, for example, recordable-type media, such as floppy disks, hard disk drives, CD ROMs, CD-Rs, etc., and transmission media, such as digital and/or analog communication links. Examples of transmission media can also include devices such as modems, which permit information to be transmitted over standard telephone lines and/or the more advanced digital communications lines.

Figure 3:
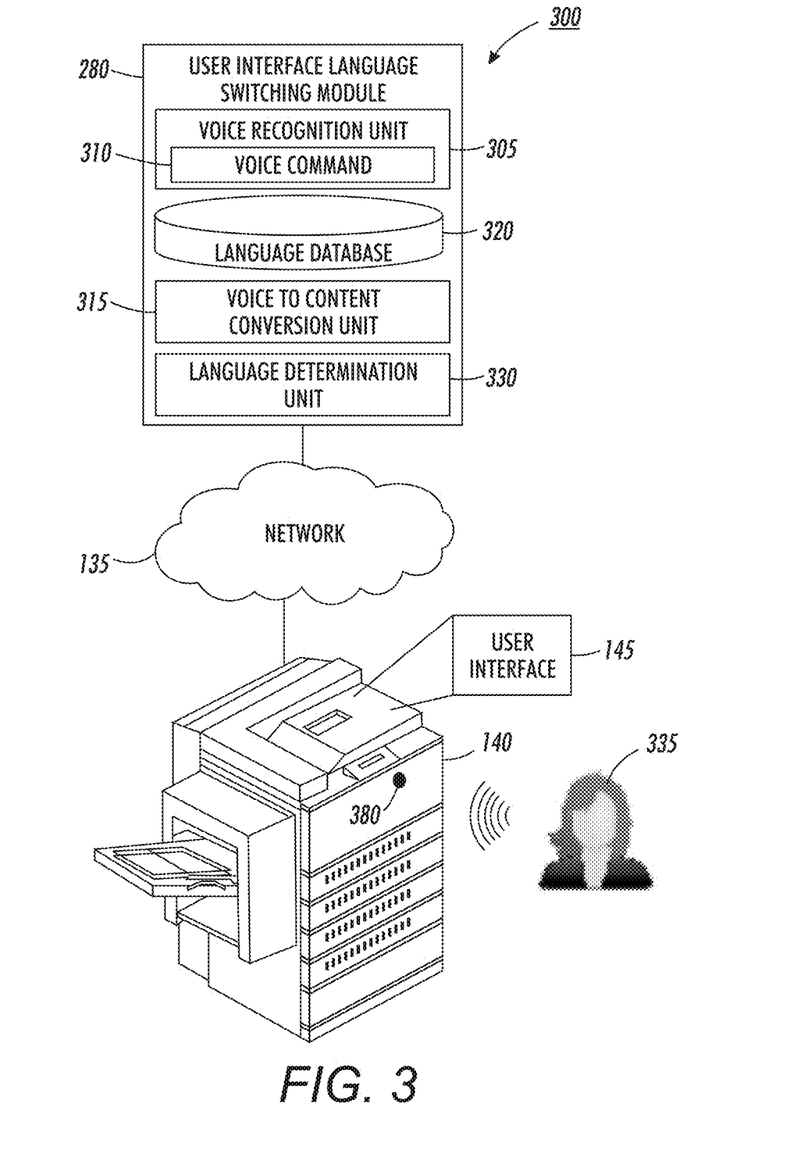
FIG. 3 illustrates a block diagram of a user interface language switching system, in accordance with the disclosed embodiments.

FIG. 3 illustrates a block diagram of a user interface language switching system 300 for switching user interface language with respect to the device 140 utilizing a voice control, in accordance with the disclosed embodiments. Note that in FIGS. 1-4, identical or similar blocks are generally indicated by identical reference numerals. The user interface language switching system 300 can be configured to include the user interface language switching module 280 in association with the device 140. The user interface language switching module 280 receives a voice command 310 with respect to a user 335 from a speech recognition device 380. The speech recognition device 380 can be located on or at the device 140. The speech recognition device 380 can be, for example, a microphone, depending upon design considerations. In one scenario, the user 335 can walk toward the machine or device 140 and speak the desired/known language. The machine or device 140 "listens" to the user's voice, detects the language, and then changes the user interface 145 accordingly to display user interface text in the detected language. The user interface language switching module 280 makes the switch to the detected language. In a preferred embodiment, implementation can occur at the software level and an additional microphone (e.g., the speech recognition device 380) and/or process can be employed to capture and process a user voice command into a primary language (e.g., the user's language) in the user interface 145.

Note that the user interface as utilized herein generally refers to a type of environment that represents programs, files, options, and so forth by means of graphically displayed icons, menus, and dialog boxes on a screen. A user can interact with the user interface to select and activate such options by pointing and clicking with a user input device such as, for example, a touch screen, a keyboard, or the like. A particular item can function in the same manner to the user in all applications because the user interface provides standard software routines to handle these elements and reports the user's actions.

The user interface language switching module 280 can be configured to further include a voice recognition unit 305, a voice-to-content conversion unit 315, and a language determination unit 330. Units 305, 315, and 330 can communicate electronically with one another. The voice recognition unit 305 recognizes and processes the voice command 310 (i.e., with respect to the user 335) received from the speech recognition device 380. The voice-to-content conversion unit 315 and the language determination unit 330 converts the voice command 310 into content to determine a language displayed via the user interface 145 utilizing a language database 320. Note that the above "units" discussed herein can be implemented in the context of a module or group of modules. That is, each unit may be, for example, a software module or may form part of a larger module composed of such units.

The language database 320 can be configured to include different languages pre-installed on the device 140. Note that language database 320 may also be implemented as, for example, database 185 shown in FIG. 1. Such languages include, but are not limited to, English, Hindi, Mandarin, Japanese, Korean, Hebrew, or Greek to name a few examples. As indicated above, the user interface language can be changed based on the detected language. In some embodiments, the system 300 can eliminate the use of a hard-button on the user interface panel 145 and the user 335 can easily vary the user interface language without referring to, for example, instruction manuals.

Figure 4:
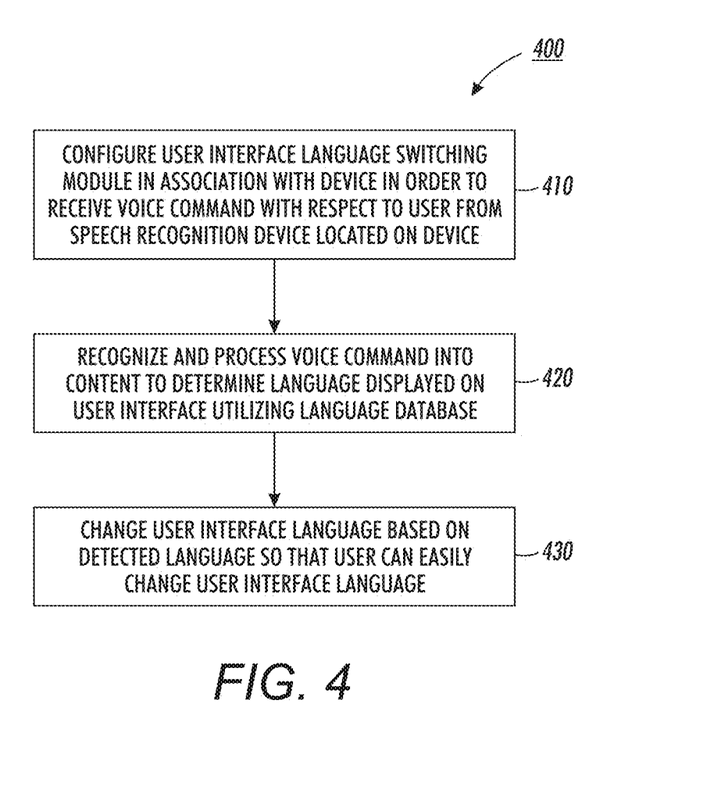
FIG. 4 illustrates a high level flow chart of operations illustrating logical operational steps of a method for switching user interface language with respect to a device utilizing a voice control, in accordance with the disclosed embodiments.

FIG. 4 illustrates a high level flow chart of operations illustrating logical operational steps of a method 400 for switching user interface language with respect to the device 140 utilizing the voice control, in accordance with the disclosed embodiment. As indicated at block 410, a step or logical operation can be implemented, wherein the user interface language switching module 280 is associated with, for example, the device 140 (e.g., a copy machine, an MFD, or a computing hand held device) in order to receive the voice command 310 with respect to the user 335 from the speech recognition device 380 (e.g., microphone) located on or associated with the device 140. Thereafter, as depicted at block 420, a step or logical operation can be implemented wherein the voice command 310 is recognized and processed into particular content to determine the language displayed on the user interface 145 utilizing the language database 320. Then, as described at block 430, the user interface language can be changed based on the detected language and the user 335 can easily alter the user interface language.

Thereafter, as illustrated block 400, a step or logical operation can be implemented in which the voice recognition unit 305 receives the voice-based input including one or more utterances or verbalizations with respect to a desired language spoken by the user 335. The database 320 can be configured to include data indicative of translations of different languages capable of being pre-installed on the device 140. The system 300 selects the language used to display messages and other information in any one of several languages by recognizing the voice command 310 of the user 335 from the speech recognition device 380. Such an approach 400 switches user interface languages with respect to the device 140 in order to be used in multiple localities in which one or more of the multiple languages is used.

It can be appreciated that variations to the embodiments discussed herein are possible. For example, in an alternative embodiment, the language processing depicted and described herein is not necessarily divorced or remote from the device. That is, in an alternative embodiment, the device can be configured to be capable of achieving the language detection independent of any remote device or database.

Additionally, as discussed earlier, embodiments are not disclosed to the use of an MFD. Reference to an MFD is for illustrative purposes only and MFDs are not considered limiting features of the disclosed embodiments. The disclosed approach can be expanded to other area of potential interest, such as, for example, automotive devices and applications, and so on. One automotive embodiment, for example, can involve detecting the driver's language and automatically setting the language for the entertainment system, especially useful in hire cars.

Finally, the device may be controlled via voice recognition, with feedback being supplied via a natural text to speech user interface. Such an implementation can also function without a GUI. For example, in one possible embodiment a telephone booking system can be implemented, which switches the language based on the first word, e.g. "Hello". Other implementations can exist in the realm of devices such as, for example, Google Glass type devices and other personal assistant voice based device.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art, which are also intended to be encompassed by the following claims.

What is claimed is:

1. A voice recognition method, comprising:
receiving a voice command with a microphone associated with a target device;
implementing an action associated with said voice command on said target device;
processing said voice command with a speech recognition unit associated with a remote language switching module connected to said target device via a network internet connection;
recognizing and processing said voice command into particular content to identify a language utilizing a language database associated with said remote language switching module;
altering said language based on a detected language so that said language can be altered without reference to an instruction manual;
displaying user interface text on said target device according to said altered language; and
providing feedback via a text to speech transcription shown on said user interface.

2. The method of claim 1 further comprising controlling said target device via voice recognition.

3. The method of claim 2 further comprising:
inputting constraint data with respect to said target device via an administrator's portable device in wireless communication with said target device.

4. The method of claim 3 wherein said database comprises data indicative of translations of a plurality of languages comprising English, Hindi, Mandarin, Japanese, Korean, Hebrew, and Greek.

5. The method of claim 4 further comprising selecting said language to display a message and other information in at least one language among said plurality of languages by recognizing said voice command via said speech recognition unit.

6. The method of claim 5 further comprising switching said language to another language with respect to said target device, said language to be used in a plurality of localities in which said at least one language among said plurality of languages is used.

7. The method of claim 1 wherein said target device comprises a multi-function printer.

8. A voice recognition system, said system comprising:
a processor; and
a computer-usable medium embodying computer program code, said computer-usable medium capable of communicating with said processor, said computer program code comprising instructions executable by said processor and configured for:
receiving a voice command;
implementing an action associated with said voice command on a target device;
processing said voice command with a speech recognition unit associated with a remote language switching module connected to said target device via a network internet connection;
recognizing and processing said voice command into particular content to identify a language utilizing a language database associated with said remote language switching module;
altering said language based on a detected language so that said language can be altered without reference to an instruction manual;
displaying user interface text on said target device according to said altered language; and
providing feedback via a text to speech transcription shown on said user interface.

9. The system of claim 8 wherein said instructions are further configured for controlling said target device via voice recognition.

10. The system of claim 9 wherein said instructions are further configured for:
inputting constraint data with respect to said target device via an administrator's portable device in wireless communication with said target device.

11. The system of claim 10 wherein said database comprises data indicative of translations of a plurality of languages comprising English, Hindi, Mandarin, Japanese, Korean, Hebrew, and Greek.

12. The system of claim 11 wherein said instructions are further configured for selecting said language to display a message and other information in at least one language among said plurality of languages by recognizing said voice command via said speech recognition unit.

13. The system of claim 12 wherein said instructions are further configured for switching said language to another language with respect to said target device, said language to be used in a plurality of localities in which said at least one language among said plurality of languages is used.

14. The system of claim 13 wherein said target device comprises a multi-function printer.

15. A non-transitory processor-readable medium storing computer code representing instructions to cause a process for voice recognition, said computer code further comprising code to:
- receive a voice command;
- implementing an action associated with said voice command on a target device;
- processing said voice command with a speech recognition unit associated with a remote language switching module connected to said target device via a network internet connection;
- recognize and process said voice command into particular content to identify a language utilizing a language database associated with said remote language switching module;
- alter said language based on a detected language so that said language can be altered without reference to an instruction manual;
- displaying user interface text on said target device according to said altered language; and
- providing feedback via a text to speech transcription shown on said user interface.

16. The non-transitory processor-readable medium of claim 15 wherein said code further comprises code to control said target device via voice recognition.

17. The non-transitory processor-readable medium of claim 16 wherein said code further comprises code to input constraint data with respect to said target device via an administrator's portable device in wireless communication with said target device.

18. The non-transitory processor-readable medium of claim 17 wherein database comprises data indicative of translations of a plurality of languages comprising English, Hindi, Mandarin, Japanese, Korean, Hebrew, and Greek.

19. The non-transitory processor-readable medium of claim 18 wherein said code further comprises code to select said language to display a message and other information in at least one language among said plurality of languages by recognizing said voice command via said speech recognition unit.

20. The non-transitory processor-readable medium of claim 19 wherein said code further comprises code to switch said language to another language with respect to said target device, said language to be used in a plurality of localities in which said at least one language among said plurality of languages is used.

* * * * *